United States Patent
Morita et al.

(10) Patent No.: US 8,133,292 B2
(45) Date of Patent: Mar. 13, 2012

(54) AIR CLEANER ASSEMBLY FOR A SMALL V-TYPE ENGINE, ENGINE INCORPORATING SAME, AND MOTORCYCLE INCORPORATING SAME

(75) Inventors: Kenji Morita, Saitama (JP); Shota Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 12/378,702

(22) Filed: Feb. 18, 2009

(65) Prior Publication Data

US 2009/0241868 A1 Oct. 1, 2009

(30) Foreign Application Priority Data

Mar. 31, 2008 (JP) ................................. 2008-092780

(51) Int. Cl.
*B01D 46/00* (2006.01)
(52) U.S. Cl. ............. 55/385.3; 55/483; 55/484; 55/418; 55/DIG. 28; 123/198 E
(58) Field of Classification Search ................. 55/385.3, 55/492, 505, 524, 320, 327, 336, 486, 487, 55/511, 309, 418, DIG. 28; 123/198 E; 180/219, 180/225, 68.6, 68.4, 69.24, 84, 89.17
See application file for complete search history.

(56) References Cited

U.S. PATENT DOCUMENTS

| 6,251,151 B1* | 6/2001 | Kobayashi et al. ............. 55/309 |
| 6,409,783 B1* | 6/2002 | Miyajima et al. ............ 55/385.3 |
| 6,726,737 B2* | 4/2004 | Schorn .......................... 55/385.3 |
| 6,910,546 B2* | 6/2005 | Tsutsumi et al. ............. 180/219 |
| 2005/0051375 A1* | 3/2005 | Momosaki .................... 180/219 |
| 2007/0289268 A1* | 12/2007 | Smith .......................... 55/385.3 |
| 2008/0053394 A1* | 3/2008 | Tsutsui et al. ........... 123/184.21 |

FOREIGN PATENT DOCUMENTS

| JP | 2000-072075 | 3/2000 |
| JP | 2003-081166 | 3/2003 |
| JP | 2006-015963 | 1/2006 |

* cited by examiner

*Primary Examiner* — Duane Smith
*Assistant Examiner* — Minh-Chau Pham
(74) *Attorney, Agent, or Firm* — Carrier Blackman & Associates, P.C.; William D. Blackman; Joseph P. Carrier

(57) ABSTRACT

An air cleaner for a V-type internal combustion engine includes a filter housing with introduction ports formed in both left and right lateral walls communicating with respective air intake ducts and a pair of cleaner elements fixedly disposed in the filter housing to partition the inside thereof into an upper unfiltered air chamber communicating with both the introduction ports and a filtered air chamber disposed below the unfiltered air chamber. The cleaner elements are disposed on both sides of a vertical plane passing through a vehicle body centerline, extend forward and rearward of the air introduction ports, and are inclined to be gradually lowered as they extend away from the vertical plane to face the respective air introduction ports.

20 Claims, 9 Drawing Sheets

AIR CLEANER ASSEMBLY FOR A SMALL V-TYPE ENGINE, ENGINE INCORPORATING SAME, AND MOTORCYCLE INCORPORATING SAME

CROSS-REFERENCE TO RELATED APPLICATIONS

The present invention claims priority under 35 USC 119 based on Japanese patent application No. 2008-092780, filed on 31 Mar. 2008. The entire subject matter of this priority document, including specification, claims and drawings, is incorporated by reference herein.

BACKGROUND OF THE INVENTION

1. Technical Field of the Invention

The present invention relates to an air cleaner assembly for a small engine in which a V-type engine main body having front and rear banks V-shaped in the back and forth direction of a body frame is mounted on the body frame and a pair of left and right extending air intake ducts opening forward are respectively connected to both left and right sides of a single air cleaner shared by the front and rear banks. In particular, the invention relates to an improvement in an air cleaner structure.

2. Background Art

Japanese Laid-open Patent document 2006-15963 ("Patent Document 1") discloses a motorcycle engine in which a pair of left and right extending air intake ducts, which open in the forward direction, are joined to respective sides of a filter housing of an air cleaner shared by both banks of a motorcycle-mounted V-type engine.

In the air cleaner disclosed in Patent Document 1 mentioned above, a pair of left and right extending air intake ducts communicate with an unfiltered air chamber formed in the rear lower portion of the filter housing. A cleaner element forming the ceiling of the unfiltered air chamber interposes between the unfiltered air chamber and a filtered air chamber. The filtered air chamber is formed in the filter housing to spread above and forward of the unfiltered air chamber. A joint member adapted to direct unfiltered air to the rear bank side of the V-type engine is connected to the bottom portion of the filter housing in order to communicate with the filtered air chamber on the unfiltered air chamber side. A joint member adapted to direct unfiltered air to the front bank side of the V-type engine connects the bottom portion of the filter housing to the filtered air chamber on a side separate from the unfiltered air chamber. Thus, air that passes through the cleaner element favors a path that flows toward the rear bank side. Consequently, it is difficult to achieve equal distribution of intake air from the air cleaner to the front and rear banks of the V-type engine main body.

Although the known air cleaner assemblies have some utility for their intended purposes, a need still exists in the art for an improved air cleaner assembly. In particular, there is a need for an improved air cleaner assembly which will overcome the problems of the known filter assemblies.

SUMMARY OF THE INVENTION

The present invention has been made in view of the situation described above, and it is an object of the invention to provide an air cleaner structure of a small-sized V-type engine, that can distribute intake air equally to front and rear banks.

To achieve the above object, a first aspect of the present invention is an air cleaner structure for a small engine in which a V-type engine main body is mounted on a body frame. The main body includes a front bank and a rear bank that is V-shaped in a back and forth direction with respect to the body frame. A pair of left and right extending air intake ducts opening forwardly are respectively connected to left and right sides of a single air cleaner shared by the front and rear banks. The air cleaner includes a filter housing with introduction ports formed in both left and right lateral walls that communicate with respective air intake ducts. A pair of cleaner elements fixedly disposed in the filter housing partitions the inside of the filter housing into an upper unfiltered air chamber communicating with both the introduction ports and a filtered air chamber disposed below the unfiltered air chamber. The filtered air chamber is shared by the front and rear banks. Both cleaner elements are fixedly housed in the filter housing so as to be disposed on both sides of a vertical plane passing through a vehicle body centerline. Further, the cleaner elements are disposed obliquely in a plane slightly offset from the horizontal such that they face their respective air intake ports.

As a second aspect of the present invention, the filter housing includes a lower case forming a lateral wall of the filtered air chamber and an upper case detachably connected to the lower case to form the unfiltered air chamber between the lower case and the upper case. A partition wall, which partitions the inside of the unfiltered air chamber into left and right portions, is integrally provided on an upper inner surface of the upper case at a position between both the cleaner elements. The left and right portions of the unfiltered air chamber correspond to respective air intake ducts.

According to the first aspect of the present invention, incoming air introduced into the unfiltered air chamber of the air cleaner from the pair of left and right extending air intake ducts hits and is shaped by the pair of cleaner elements. Incoming air then passes equally through the filter elements as it flows toward the filtered air chamber. In particular, the cleaner elements are disposed on both sides of the vertical plane passing through the vehicle body centerline. Front and rear portions of each filter element extend both forward and reward of the respective air intake ports. In this way, an equalization of the flow of air into the filtered air chamber can be achieved. For example, providing left and right filter elements equalizes the incoming air between the left and right banks and forward and rearward extensions of the filter elements equalized the amount of intake air that is distributed into the front and rear banks. Additionally, the filter elements are obliquely inclined from the horizontal plane such that an inner edge of each filter element, adjacent the aforementioned vertical plane, is positioned vertically higher than an outer edge adjacent to the air intake ports. This oblique arrangement of the cleaner elements allows for the surface area thereof to be increased without increasing the width of the filter housing.

According to the second aspect of the present invention, the partition wall provided on the upper inner surface of the upper case at a position between the cleaner elements partitions the inside of the unfiltered air chamber into left and right portions. Thus, the incoming air introduced from respective air intake ducts into the unfiltered air chamber passes through the cleaner elements more equally with respect to left and right sides of the main body as it flows toward the filtered air chamber.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
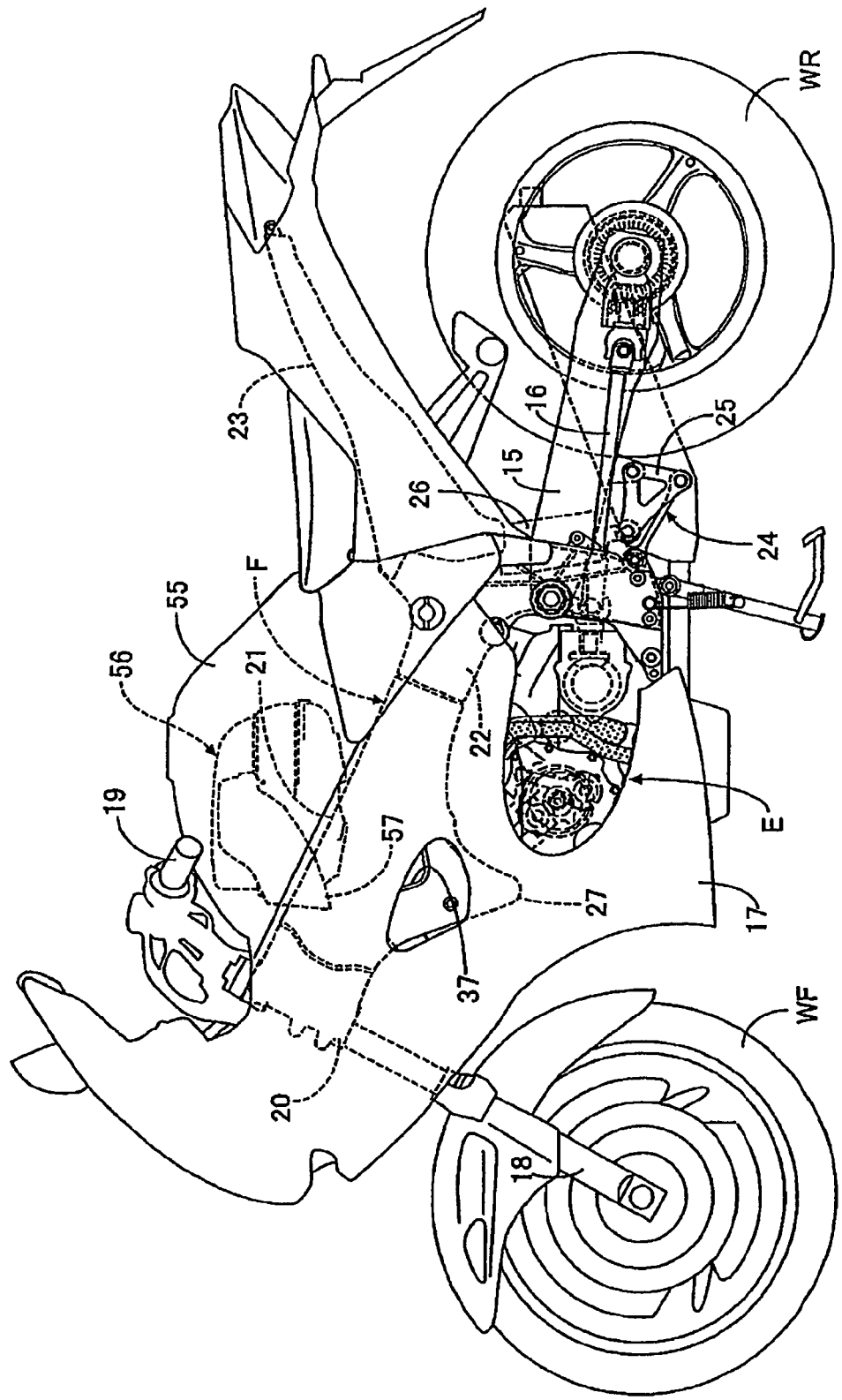
FIG. 1 is a left lateral view of a motorcycle.

FIGS. 1 through 9 depict a selected illustrative embodiment of the present invention. Referring first to FIG. 1, for example, a 4-cylinder V-type engine E is mounted on a vehicle frame F of a motorcycle. A rear wheel WR is rotatably supported by the rear portion of a swing arm 15 vertically and swingably carried by the body frame F. Power from the engine E is transmitted to the rear wheel WR via a drive shaft 16 extending back and forth. A portion of the engine E and the body frame F are covered by a body cover 17, which is mounted to the body frame F.

Figure 2:
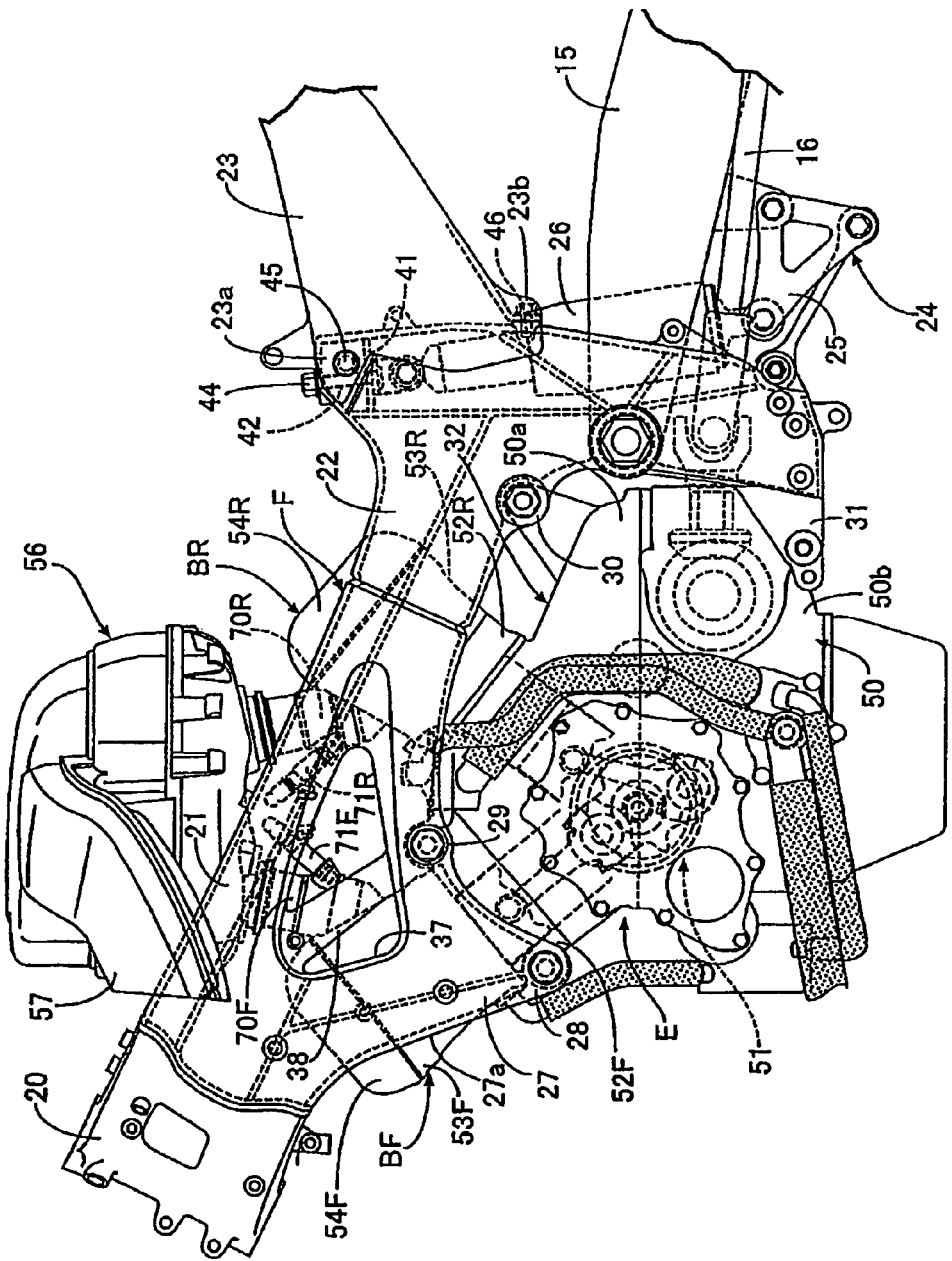
FIG. 2 is an enlarged lateral view of a major portion of FIG. 1, with a body cover omitted for illustrative purposes.
Figure 3:
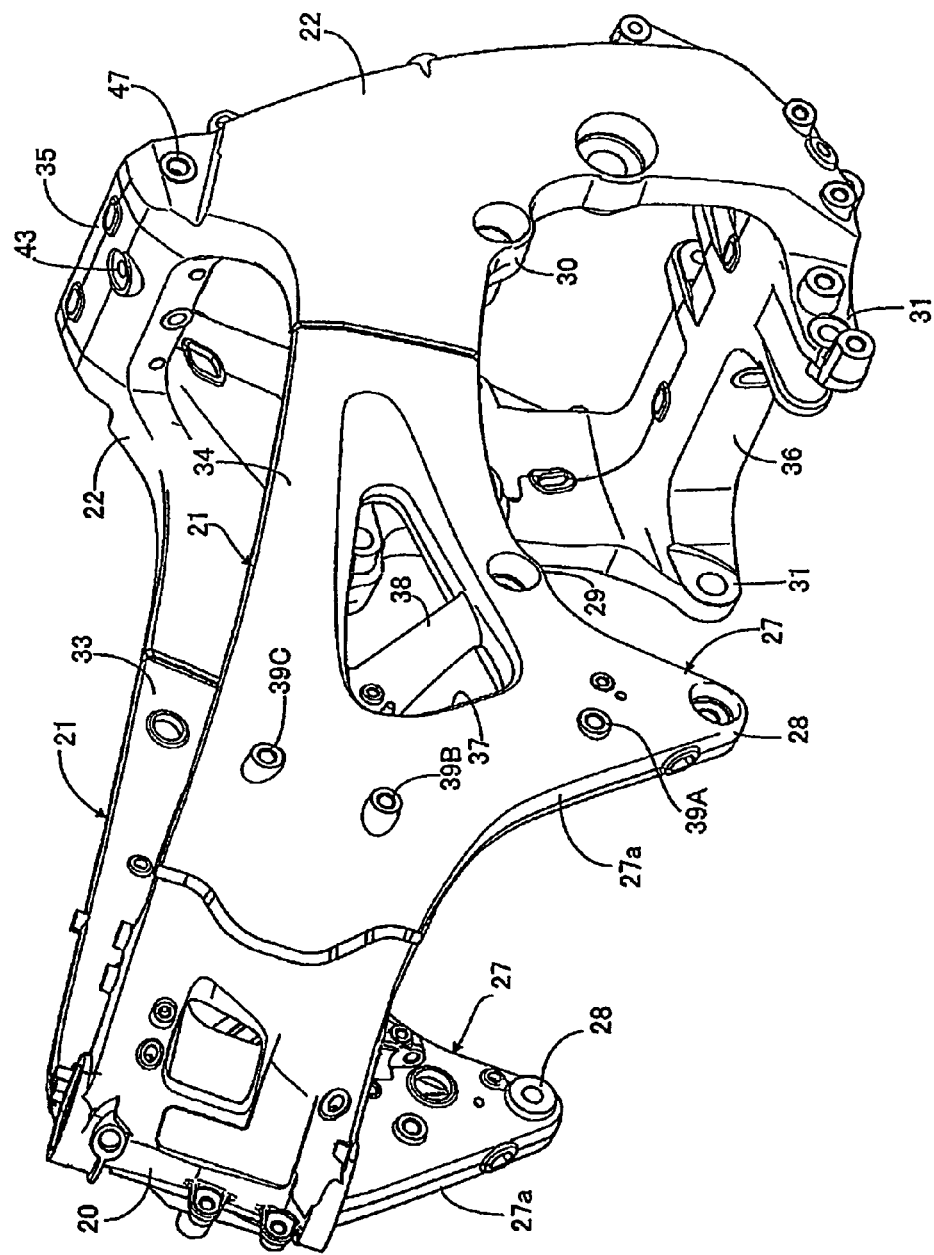
FIG. 3 is a perspective view illustrating a head pipe, main frame sections, and pivot plates.
Figure 4:
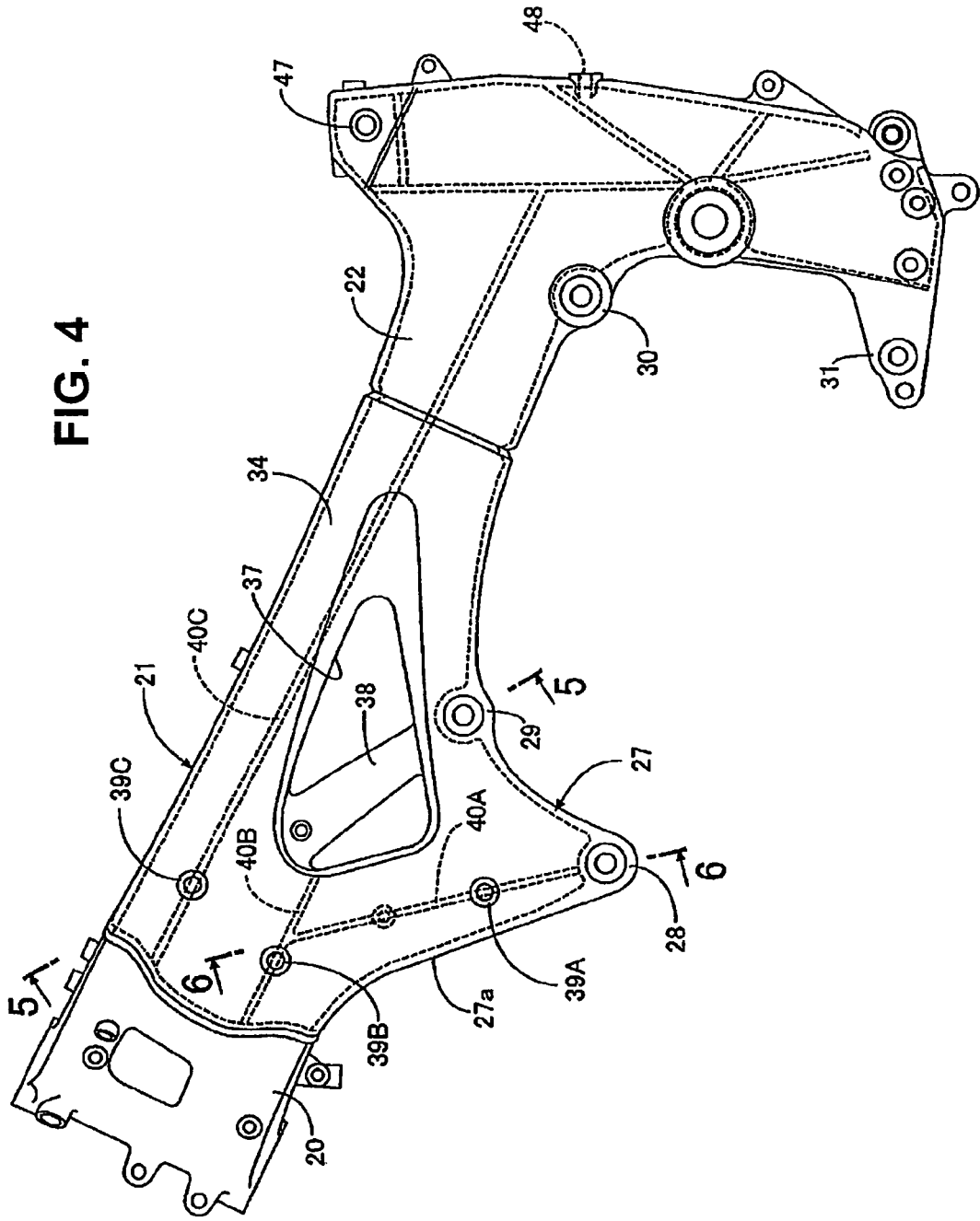
FIG. 4 is a left lateral view illustrating the head pipe, main frame sections and pivot plates.

With additional reference to FIGS. 2 to 4, the body frame F includes a head pipe 20 pivotally supporting a front fork 18 rotatably supporting a front wheel WF, and a steering handlebar 19 which is operatively attached to the front fork. The body frame F also includes a pair of left and right main frame sections 21 extending rearward downwardly from the head pipe 20; a pair of left and right pivot plates 22 connected to the rear portions of the main frame sections 21 and extending downward; and a pair of left and right seat rails 23 connected at front ends to the upper portions of the pivot plates 22 and extending rearward upward. The rear wheel WR is rotatably supported on a rear portion of the swing arm 15. A front portion of the swing arm 15 is reciprocally pivotally supported between the pivot plates 22. In addition, a link mechanism 24 is provided between the lower portion of one of both the pivot plates 22 and the front portion of the swing arm 15. A rear shock absorber 26 is provided between the body frame F and a link member 25 constituting part of the link mechanism 24.

The main frame sections 21 provide integral engine hangers 27 hanging downward from intermediate portions of the main frame sections 21. An engine main body 32 of the engine E is suspended by and mounted to the engine hangers 27 and the pivot plates 22. Specifically, first and second engine support portions 28 and 29 are integrally provided at the lowermost portions and rear upper portions, respectively, of the engine hangers 27. In addition, third and fourth engine support portions 30 and 31 are integrally provided at the upper portions and lower portions, respectively, of the pivot plates 22. The engine main body 32 is supported by the engine support portions 28, 29, 30, 31.

Figure 5:
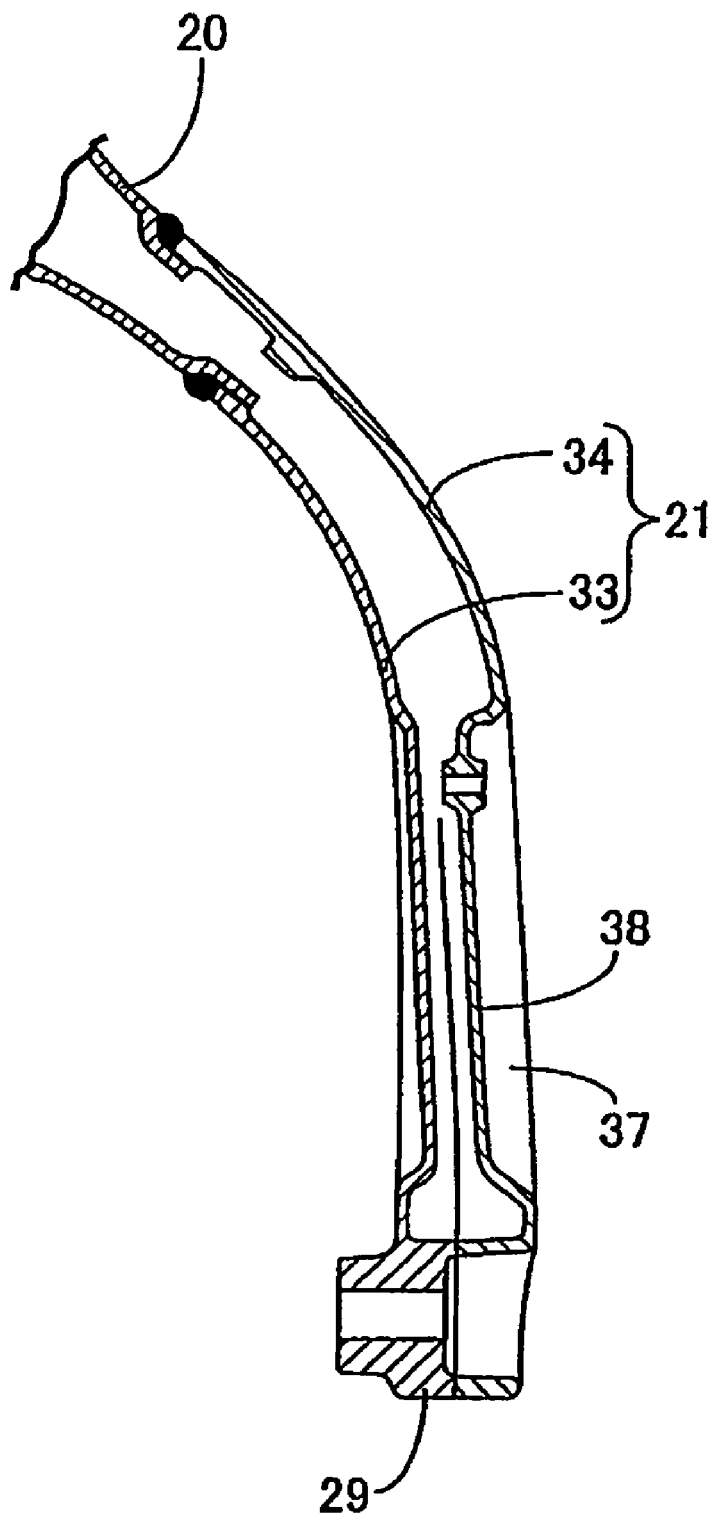
FIG. 5 is a cross-sectional view taken along line 5-5 of FIG. 4.
Figure 6:
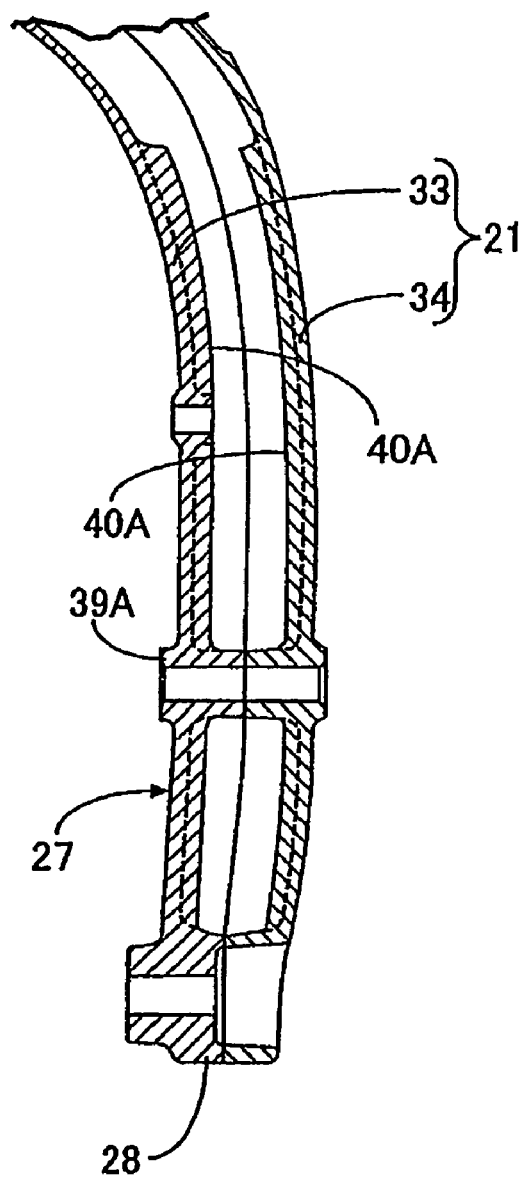
FIG. 6 is a cross-sectional view taken along line 6-6 of FIG. 4.

Referring to FIGS. 5 and 6, the main frame sections 21 are each formed with an internal hollow or void, by joining together two frame members 33, 34 subjected to press working. The front ends of the main frame sections 21 are welded to the head pipe 20. Similarly, the engine hangers 27, integral with the main frame sections 21, are each formed with an internal hollow by joining together the two frame members 33, 34. The pivot plates 22 are welded to the rear portions of the respective main frame sections 21, and extend vertically. The upper portions of both the pivot plates 22 are integrally connected to each other by an upper cross member 35. The lower portions of both the pivot plates 22 are integrally connected to each other by a lower cross member 36.

The engine hangers 27 are each integrally continuous with an intermediate portion of the main frame 21 to hang downwardly therefrom. A front edge 27a of the engine hanger 27 is formed to be inclined forwardly and upwardly toward the head pipe 20. In addition, both frame members 33, 34 of the main frame sections 21 are provided at upper portions of the engine hangers 27 with through-holes 37 to reduce the weight of the main frame sections 21. The main frame sections 21 are each provided with a reinforcing portion 38 which extends generally parallel to the front edge 27a of the engine hanger 27 so as to longitudinally traverse the through-hole 37. The second engine support portion 29 is provided on the extension of the reinforcing portion 38 and at the lower portion of the engine hanger 27 in order to carry the engine main body 32.

A plurality of, e.g. three, attachment bosses 39A, 39B, 39C are provided on each of the main frame sections 21 including the engine hangers 27 in order to attach a vehicle constituting component, e.g., the body cover 17 thereto. Ribs 40A, 40A are integrally provided on the inner surfaces of the two frame members 33, 34 constituting the main frame sections 21 and the engine hangers 27. As shown in FIG. 6, each of the ribs 40A, 40A connect the first engine supporting portion 28 located at the lowermost portion of the engine hanger 27, the attachment bosses 39A, 39B and the head pipe 20 together. In addition, the rib 40B connecting the attachment boss 39B with the head pipe 20 and the rib 40C connecting the attachment boss 39C with the head pipe 20 are integrally provided close to the main frame sections 21 and on the inner surfaces of both the frame members 33, 34. The ribs 40A, 40B and 40C can increase the rigidity of the main frame sections 21 and engine hangers 27 per se and reduce vibration sound transmitted from the body cover 17 to the main frame sections 21 and to the engine hangers 27.

In addition, as clearly shown in FIG. 6, each of the attachment bosses 39A, 39B, 39C is provided between the rear and front frame members 33, 34 of each of the main frame sections 21 and of each of the engine hangers 27.

The upper cross member 35 integrally connecting the respective upper portions of both pivot plates 22 is formed with an insertion hole 43 at a central portion. This insertion hole 43 is adapted to receive an upper portion of a bolt 42 passed therethrough. The bolt 42 is engaged from below with the cushion support member 41 connected to the upper end of the rear shock absorber 26. A nut 44 is screwed to the portion of the bolt 42 projecting upward from the insertion hole 43. In this way, the upper end of the rear shock absorber 26 is connected to and supported by the upper cross member 35 of the body frame F.

The seat rails 23 are each fastened at a front end portion to the upper portion of the pivot plate 22 at two positions vertically spaced apart from each other. The front end portion of each seat rail 23 is provided with a first attachment portion 23*a* and a second attachment portion 23*b*. The first attachment portion 23*a* is provided to laterally overlap a rear upper lateral surface of the pivot plate 22. The second attachment portion 23*b* is disposed below the first attachment portion 23*a* to overlap from rearward the rear surface of the rear portion of the pivot plate 22.

On the other hand, the pivot plates 22 are each provided at rear upper portions with attachment bosses 47 adapted to each receive a first bolt 45 screwed thereinto. The first bolt 45 is inserted into the first attachment portion 23*a* from the horizontal outside of the body frame F. In addition, the pivot plates 22 are each provided at a rear surface of the rear portion with a screw hole 48 adapted to receive a second bolt 46 screwed thereinto. The second bolt 46 is inserted into each of the second attachment portions 23*b* from the rear side of the body frame F.

Referring now to FIG. 2, the engine main body 32 is V-type and water-cooled with a front bank BF located anteriorly, and a rear bank BR located rearward of the front bank BF while mounted on the motorcycle. A crankshaft 51 extending in a vehicle-widthwise direction, i.e., in a left-right direction of the motorcycle is rotatably journaled by the crankcase 50 shared by both the front and rear banks BF, BR.

The crankcase 50 is formed by joining together an upper case half-body 50*a* and a lower case half-body 50*b*. The front bank BF and the rear bank BR are formed integrally with the upper case half-body 50*a* so as to be V-shaped in the bank and forth direction of the body frame F. An axis of the crankshaft 51 is located on a joint surface between the upper case half-body 50*a* and the lower case half-body 50*b*.

The front bank BF includes a front cylinder block 52F integrally continuous with the upper case half-body 50*a* of the crankcase 50; a front cylinder head 53F joined to the front cylinder block 52F; and a front head cover F joined to the front cylinder head 53F. The rear bank BR includes a rear cylinder block 52R integrally continuous with the upper case half-body 50*a* of the crankcase 50; a rear cylinder head 53 joined to the rear cylinder block 52R; and a rear head cover 54R joined to the rear cylinder head 53R.

A single air cleaner 56 shared by the front and rear banks BF, BR is disposed above the engine main body 32. A pair of left and right extending air intake ducts 57, which open in the forward direction, are respectively joined to left and right sides of the air cleaner 56. A fuel tank 55 is mounted on both the main shafts 21 of the body frame F so as to cover the air cleaner 56 and the extending air intake ducts 57 from above.

Figure 7:
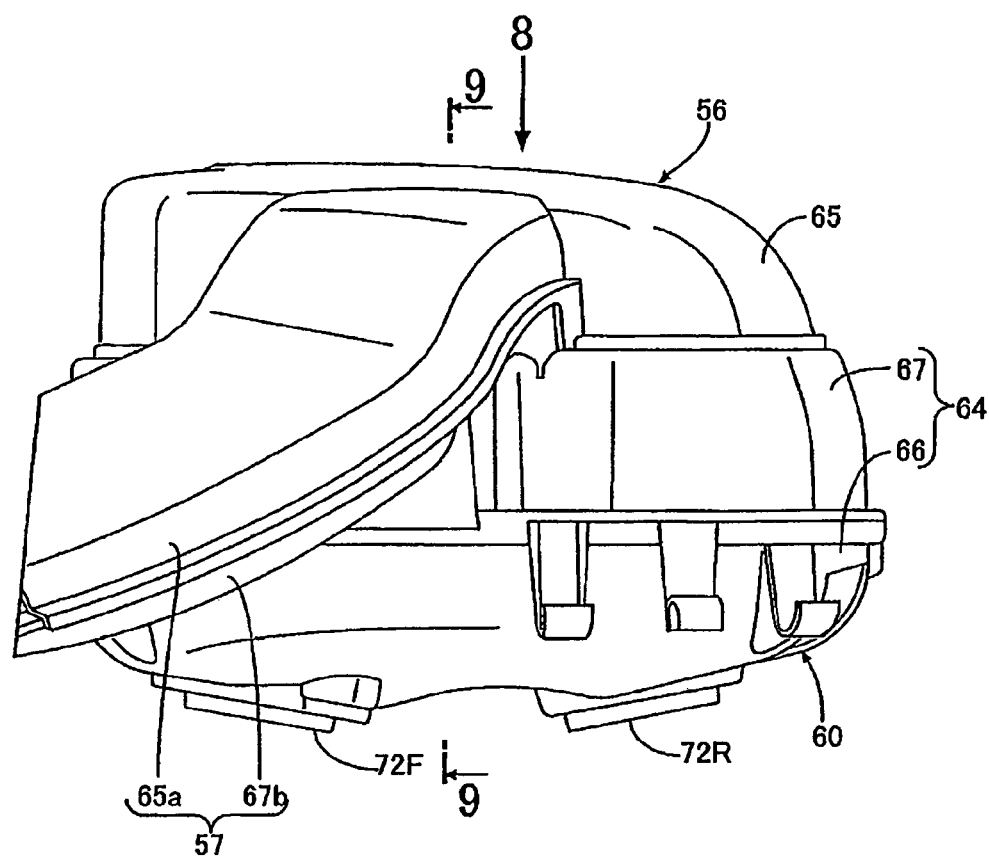
FIG. 7 is a left lateral view of an air cleaner.
Figure 8:
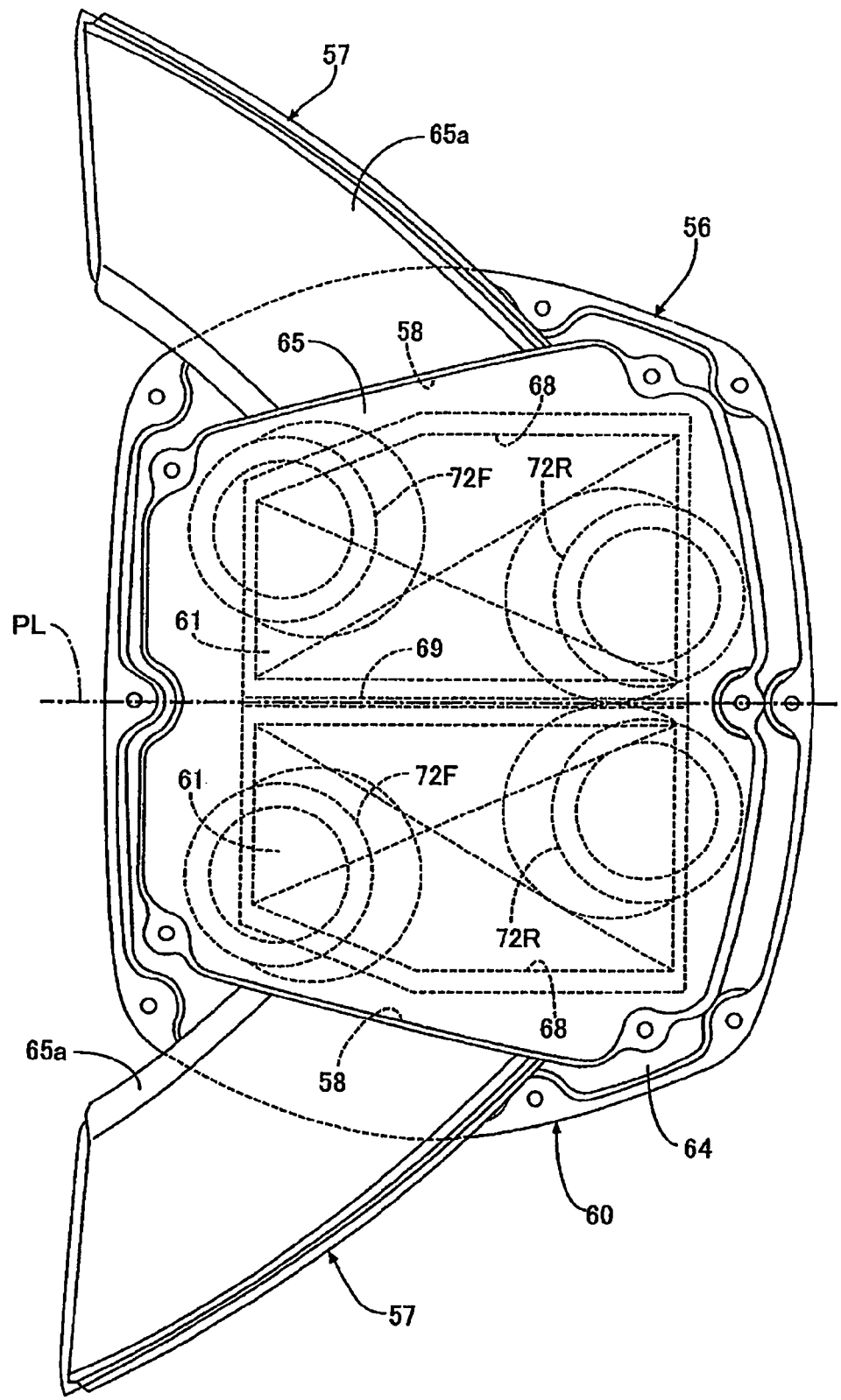
FIG. 8 is a view as viewed from arrow 8 of FIG. 7.
Figure 9:
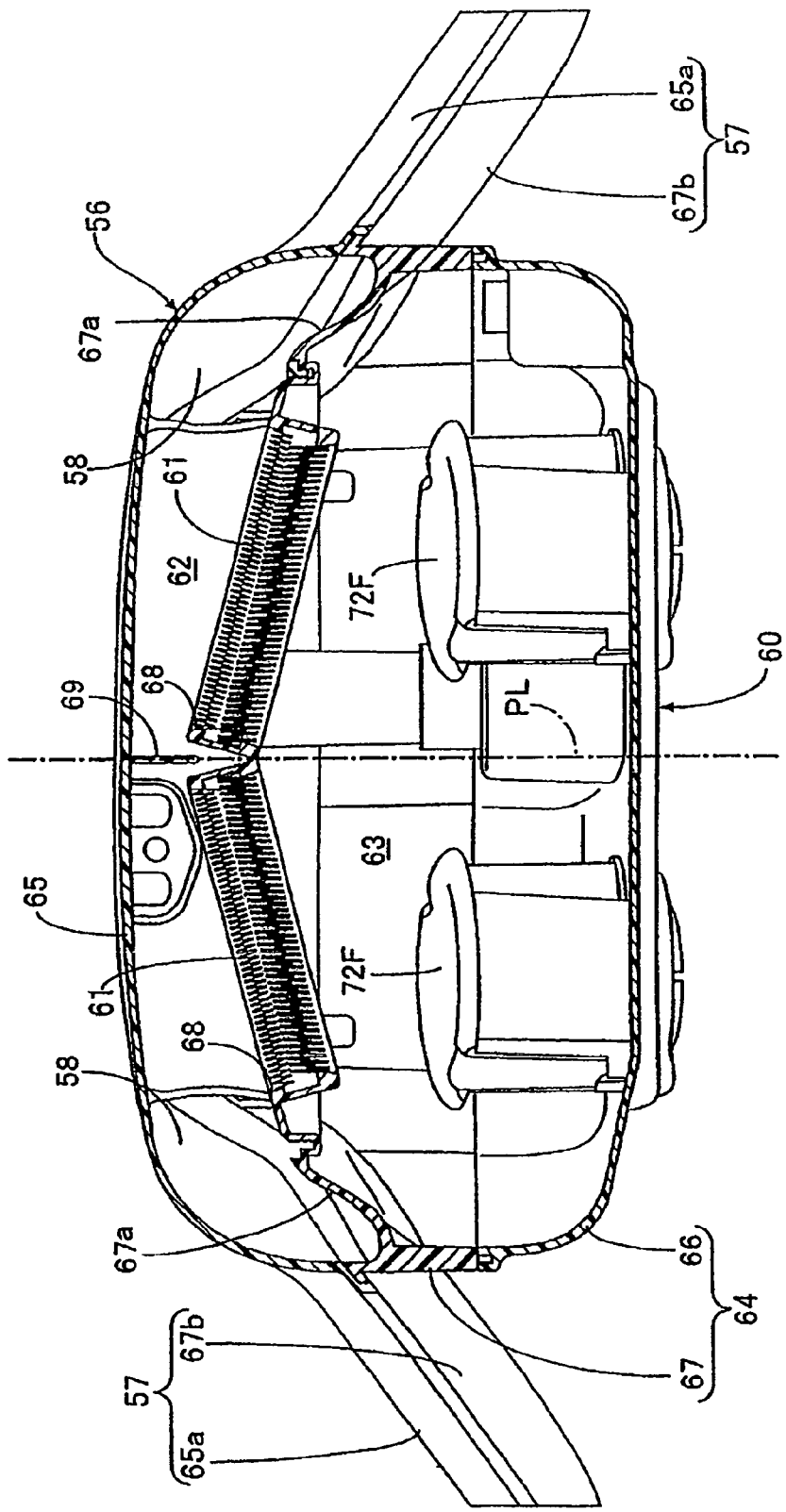
FIG. 9 is a cross-sectional view taken along line 9-9 of FIG. 7.

Referring to FIGS. 7 to 9, the air cleaner 56 includes a filter housing 60 and a pair of cleaner elements 61, 61. The filter housing 60 includes left and right introduction ports 58 formed in respective lateral walls that communicate with the corresponding air intake ducts 57. The cleaner elements 61, 61 are fixedly disposed in the filter housing 60 to partition the inside thereof into an upper unfiltered air chamber 62 and a filtered air chamber 63 disposed below the unfiltered air chamber 62. Both the front bank BF and the rear bank BR share the filtered air chamber 63.

The filter housing 60 includes a lower case 64 forming a lateral wall of the filtered air chamber 63 and an upper case 65 detachably connected to the lower case 64 to form the unfiltered air chamber 62 between the lower case 64 and the upper case 65. The lower case 64 includes a first case member 66 formed like a bowl to open upward and a second case member 67 connected from above to the first case member 66 to form the filtered air chamber 63 between the first case member 66 and the second case member 67. A ceiling wall 67*a* of the second case member 67 is formed in a mountain-shape that peaks in height at the vertical plane PL passing through a vehicle-body centerline extending forward and rearward through the widthwise central portion of the filter housing 60.

The ceiling wall 67*a* of the second case member 67 is formed with opening portions 68 on both sides of the vertical plane PL. The air-permeable cleaner elements 61 are attached to the ceiling wall 67*a* of the second case member 67 so as to cover the corresponding openings 68. Thus, both the cleaner elements 61 are fixedly housed inside the filter housing 60 so as to be inclined to be gradually lowered as they move away from the vertical plane PL. Moreover, an inner edge of each cleaner elements 61 positioned adjacent the vertical plane PL is disposed vertically higher than an outer edge of each element 61 positioned adjacent to respective air introduction ports 58.

Both the extending air intake ducts 57 are each formed by joining together a duct half-portion 67*b* integrally continuous with the second case member 67 of the lower case 64 and a duct half-portion 65*a* integrally continuous with the upper case 65. The extending air intake ducts 57 extend forwardly and obliquely downwardly through both sides of the filter housing 60 from introduction ports 58 provided on both lateral walls of the upper case 65 of the filter housing 60 so as to be continuous with the unfiltered air chamber 62.

In this way, the cleaner elements 61, which are disposed in an inclined configuration to be gradually lowered as they are away from the vertical plane PL, face the introduction ports 58 of both the lateral walls of the filter housing 60. Moreover, an unfiltered air side of each cleaner element 61 faces the introduction ports 58.

Further, a partition wall 69 integrally provided on the upper inner surface of the upper case 65 at a position between the pair of cleaner elements 61 partitions the inside of the unfiltered air chamber 62 into the left and right portions corresponding respectively to both the extending air intake ducts 57.

Referring again to FIG. 2, throttle bodies 70F individually corresponding to two cylinders provided for the front bank BF are connected to the lateral wall, facing the rear bank BR, of the front cylinder head 53F in the front bank BF so as to rise upwardly. In addition, throttle bodies 70R individually corresponding to two cylinders provided for the rear bank BR are connected to the lateral wall, facing the front bank BF, of the rear cylinder head 53R in the rear bank BR so as to rise upwardly. Fuel injection valves 71F, 71R are each attached to respective throttle bodies 70F, 70R.

Referring to FIGS. 8 and 9, a pair of intake pipes 72F, 72F connected respectively to both the throttle bodies 70F of the front bank BF and a pair of intake pipes 72R, 72R connected respectively to both the throttle bodies 70R are attached to the bottom wall of the lower case 64 of the first case member 66 such that their upper ends open toward the filtered air chamber 63.

The following provides a description of the operation of the illustrative embodiment. The engine main body 32 having the front and rear banks BF, BR V-shaped in the back and forth direction of the body frame F is mounted on the body frame F. The single air cleaner 65 shared by the front and rear banks BF, BR includes the filter housing 60 with the introduction ports 58 formed in respective lateral walls thereof. The introduction ports 58 communicate with respective air intake ducts 57.

The pair of cleaner elements 61, 61 fixedly disposed in the filter housing 60 partition the inside thereof into the upper unfiltered air chamber 62 and the filtered air chamber 63 disposed below the unfiltered air chamber 62. The unfiltered air chamber 62 receives incoming air from both the introduction ports 58 while the front and rear banks BF, BR share the filtered air chamber 63. Both cleaner elements 61 are fixedly housed in the filter housing 60 so as to be disposed on both the sides of the vertical plane PL.

The filter elements 61 are obliquely inclined from the horizontal plane such that an inner edge of each filter element, adjacent the vertical plane PL, is positioned vertically higher than an outer edge adjacent to the air introduction ports 58. Accordingly, an unfiltered air side of each cleaner element 61 faces the respective air introduction port 58. This oblique arrangement of the cleaner elements 61 allows for the surface area thereof to be increased without increasing the width of the filter housing.

Thus, incoming air introduced into the unfiltered air chamber 62 from the air introduction ports 58 by the pair of left and right extending air intake ducts 57 impinges upon, and is shaped by the cleaner elements 61. The air shaping resulting from the inclined cleaner elements 61 allows for a substantially equal amount of air to pass into the filtered air chamber 63 from each cleaner element 61. Since the air flowing in the filtered air chamber 63 is equalized, intake air can be equally distributed into the front and rear banks BF, BR. In addition, since the cleaner elements 61 are arranged in an inclined configuration, the filtration area can be increased without increasing the width of the filter housing 60.

The filter housing 60 includes the lower case 64 forming the lateral wall of the filtered air chamber 63 and the upper case 65 detachably connected to the lower case 64 to form the unfiltered air chamber 62 between the lower case 64 and the upper case 65. In addition, the partition wall 69 integrally provided on the upper inner surface of the upper case 65 at a position between both the cleaner elements 61 partitions the inside of the unfiltered air chamber 62 into the left and right portions corresponding to respective air intake ducts 57. Thus, the partition wall 69 further equalizes the amount of incoming air that passes through each cleaner elements 61.

In the body frame F, the pair of left and right main frame sections 21 extending rearwardly downwardly from the head pipe 20 are each integrally provided with the engine hanger 27 having the front edge 27a formed to be inclined forwardly upwardly toward the head pipe 20 and hanging downwardly from the intermediate portion of the main frame 21. In addition, both the main frame sections 21 are each formed with the through-hole 37 above the engine hanger 21. Thus, weight saving of the main frame sections 21 can be achieved.

In addition, the reinforcing portions 38 extending generally parallel to the front edges 27a of the engine hangers 27 are each provided in the main frame 21 so as to longitudinally traverse the through-hole 37. Therefore, the through-holes 37 can each effectively be reinforced by the reinforcing portion 38 to withstand a bending load acting on the main frame 21 with the head pipe 20 serving as a fulcrum.

The first engine support portions 28 for supporting the engine main body 32 are each provided at the lowermost portion of the engine hanger 27 formed hollow along with the main frame 21. The ribs 40A, 40B connecting the attachment bosses 39A, 39B, the first engine support portion 28 and the head pipe 20 together are provided to project from the internal surfaces of the engine hanger 27 and the main frame 21, respectively. The attachment bosses 39A and 39B are provided on both the main frame 21 and the engine hanger 27, respectively, to mount the body cover 17 thereto in this embodiment. Incidentally, the attachment boss 39A or 39B may be provided on at least a corresponding one of the main frame 21 and the engine hanger 27. Thus, the rigidity of the main frame sections 21 and of the engine hangers 27 can be ensured and external appearance thereof can be enhanced because the ribs 40A, 40B will not exposed to the external surfaces of the main frame sections 21 and of the engine hangers 27.

The attachment bosses 39A, 39B, 39C are provided between the rear and front frame members 33, 34 of at least one of the main frame 21 and the engine hanger 27. Thus, the attachment bosses 39A, 39B, 39C are made to function as struts of the hollow main frame 21 and engine hanger 27 to thereby enhance the rigidity of the main frame 21 and of the engine hanger 27.

The second engine support portions 29 are each provided on the extension of the reinforcing portion 38 and below the engine hanger 27; therefore, the supporting rigidity of the engine main body 32 can be enhanced.

The front end portion of the seat rail 23 is fastened at two upper and lower positions to the upper portion of the pivot plate 22. In this case, the first attachment portion 23a laterally overlapping a rear upper lateral surface of the pivot plate 22 and the second attachment portion 23b disposed below the first attachment portion 23a to overlap from rearward the rear surface of the rear portion of the pivot plate 22 are provided at the front end portion of the seat rail 23. The first attachment portion 23a is fastened to the pivot plate 22 with the first bolt 45 from the horizontal outside of the seat rail 23 and the second attachment portion 23b is fastened to the pivot plate 22 with the second bolt 46 from the rear side of the pivot plate 22.

In this way, a load applied to the second bolt 46 along with the load applied from the seat rail 23 from above is extremely small; therefore, the pivot plate 22 only needs to be provided with a simple screw hole 48 adapted to receive the second bolt 46 screwed thereinto, at a portion corresponding to the second attachment portion 23b. Thus, it is possible to firmly fasten the front end portion of the seat rail 23 to the pivot plate 22 while preventing a weight increase due to the increased thickness of the pivot plate 22 at a portion corresponding to the second attachment portion 23b of the seat rail 23.

Thus, an embodiment of the present invention has been described. However, the present invention is not limited to the embodiment described above. Other designs may include modifications of the above-described embodiment without departing from the invention recited in claims.

For example, the illustrative embodiment described herein describes a motorcycle incorporating a motorcycle engine to which the invention is applied. However, the present invention is applicable to small-sized engines other than motorcycles, such as other saddle-type vehicles including three-wheelers and ATVs.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An air cleaner structure for a small V-type engine in which an engine main body having a front bank and a rear bank V-shaped in a back and forth direction of a body frame is mounted on the body frame, and a pair of left and right extending air intake ducts opening forward are respectively connected to both left and right sides of a single air cleaner shared by the front and rear banks, comprising:

a filter housing having an introduction port formed in each of the left and right lateral walls, each introduction port communicating with respective air intake ducts; and, a pair of cleaner elements fixedly disposed in the filter housing partitioning the inside of the filter housing into an upper unfiltered air chamber communicating with both of the introduction ports, and a filtered air chamber disposed below the unfiltered air chamber and shared by the front and rear banks; wherein the cleaner elements are adapted to be disposed on opposing sides of a vehicle body centerline, extend forwardly and rearwardly of the air introduction ports, and are inclined to be gradually lowered as the cleaner elements extend away from the vehicle body centerline to face respective air introduction ports.

2. The air cleaner structure for a small engine according to claim 1, wherein a lower case portion of the filter housing forms a lateral wall of the filtered air chamber, wherein an upper case portion of the filter housing detachably connected to the lower case portion forms the unfiltered air chamber between the lower and upper case portions, and further comprising a partition wall integrally provided on an upper inner surface of the upper case at a position between the cleaner elements, to partition the inside of the unfiltered air chamber into left and right portions corresponding to respective air intake ducts.

3. An air cleaner structure for a small engine having front and rear banks of throttle bodies, said air cleaner structure comprising:

a vertically bifurcated filter housing having an unfiltered air chamber fed by opposing left and right air introduction ports, a filtered air chamber shared by the front and rear banks, and a plurality of openings between the unfiltered air chamber and the filtered air chamber; and a plurality of cleaning elements disposed over respective openings, wherein the plurality of cleaning elements are divided into a first set disposed on a first side a vehicle body centerline and a second set disposed on a second side of the centerline opposing the first side such that an equal amount of air from the air intake ducts passes through each of the first and second sets of cleaning elements.

4. The air cleaner structure according to claim 3, wherein an inner edge of each set of cleaning elements is disposed adjacent the vehicle body centerline; and an outer edge of each set of cleaning elements is disposed adjacent a respective air introduction port, wherein the outer edge is positioned vertically lower than the inner edge.

5. The air cleaner structure according to claim 4, further comprising a partition wall disposed within the unfiltered air chamber between the first and second sets of cleaning elements.

6. The air cleaner structure according to claim 3, wherein a front portion of each set of cleaning elements extends forward of the air introduction ports, and wherein a rear portion of each set of cleaning elements extends rearward of the air introduction ports.

7. The air cleaner structure according to claim 4, wherein a front portion of each set of cleaning elements extends forward of the air introduction ports, and wherein a rear portion of each set of cleaning elements extends rearward of the air introduction ports.

8. The air cleaner structure according to claim 5, wherein a front portion of each set of cleaning elements extends forward of the air introduction ports, and wherein a rear portion of each set of cleaning elements extends rearward of the air introduction ports.

9. The air cleaner structure according to claim 3, further comprising a partition wall disposed within the unfiltered air chamber between the first and second set of cleaning elements.

10. The air cleaner structure according to claim 9, wherein a front portion of each set of cleaning elements extends forward of the air introduction ports, and wherein a rear portion of each set of cleaning elements extends rearward of the air introduction ports.

11. A V-type engine comprising an engine main body having a front bank and a rear bank cooperating to form a V-shape extending in a longitudinal direction of a body frame, and a single air cleaner shared by the front and rear banks, said air cleaner comprising:

a filter housing having an introduction port formed in each of the left and right lateral walls, each introduction port communicating with respective air intake ducts; and, a pair of cleaner elements fixedly disposed in the filter housing partitioning the inside of the filter housing into an upper unfiltered air chamber communicating with both the introduction ports and a filtered air chamber disposed below the unfiltered air chamber and shared by the front and rear banks;

wherein the cleaner elements are disposed on opposing sides of a vehicle body centerline, extending forward and rearward, the air introduction ports and are inclined to be gradually lowered as the cleaner elements are away from the vehicle body centerline to face respective air introduction ports; and said left and right extending air intake ducts are respectively connected to left and right sides of said filter housing.

12. The V-type engine according to claim 11, wherein a lower case portion of the filter housing forms a lateral wall of the filtered air chamber, wherein an upper case portion of the filter housing detachably connected to the lower case portion forms the unfiltered air chamber between the lower and upper case portions, and further comprising a partition wall integrally provided on an upper inner surface of the upper case at a position between the cleaner elements, to partition the inside of the unfiltered air chamber into left and right portions corresponding to respective air intake ducts.

13. An internal combustion engine having front and rear banks of throttle bodies, said engine comprising an air cleaner apparatus comprising:

a vertically bifurcated filter housing having an unfiltered air chamber fed by opposing left and right air introduction ports, a filtered air chamber shared by the front and rear banks, and a plurality of openings between the unfiltered air chamber and the filtered air chamber; and a plurality of cleaning elements disposed over respective openings, wherein the plurality of cleaning elements are divided into a first set disposed on a first side a vehicle body centerline and a second set disposed on a second side of the centerline opposing the first side such that a substantially equal amount of air from the air intake ducts passes through each of the first and second sets of cleaning elements.

14. The engine according to claim 13, wherein an inner edge of each set of cleaning elements is disposed adjacent the vehicle body centerline; and an outer edge of each set of cleaning elements is disposed adjacent a respective air introduction port, wherein the outer edge is positioned vertically lower than the inner edge.

15. The engine according to claim 14, further comprising a partition wall disposed within the unfiltered air chamber between the first and second set of cleaning elements.

16. The engine according to claim 13, wherein a front portion of each set of cleaning elements extends forward of the air introduction ports; and wherein a rear portion of each set of cleaning elements extends rearward of the air introduction ports.

17. A motorcycle comprising a body frame, and the engine of claim 11 operatively attached to said body frame.

18. The motorcycle according to claim 17, wherein a lower case portion of the filter housing forms a lateral wall of the filtered air chamber, wherein an upper case portion of the filter housing detachably connected to the lower case portion forms the unfiltered air chamber between the lower and upper case portions, and further comprising a partition wall integrally provided on an upper inner surface of the upper case at a position between the cleaner elements, to partition the inside of the unfiltered air chamber into left and right portions corresponding to respective air intake ducts.

19. The motorcycle of claim 18, wherein an inner edge of each set of cleaning elements is disposed adjacent the vehicle body centerline; and an outer edge of each set of cleaning elements is disposed adjacent a respective air introduction port, wherein the outer edge is positioned vertically lower than the inner edge.

20. A motorcycle comprising a body frame, and the engine of claim 13 operatively attached to said body frame.

\* \* \* \* \*